United States Patent Office 3,106,585
Patented Oct. 8, 1963

3,106,585
PROCESS FOR THE PREPARATION OF ALPHA, ALPHA-DICHLOROSULFONES
Karoly Szabo, Yonkers, N.Y., assignor to Stauffer Chemical Company, New York, N.Y., a corporation of Delaware
No Drawing. Filed June 16, 1961, Ser. No. 117,510
4 Claims. (Cl. 260—607)

This invention is concerned with a new type of organic reaction whereby carbon to carbon bonds are formed in an unexpected and unprecedented manner. In particular, the present invention is concerned with a synthesis of $\alpha,\alpha$-dichlorosulfones. The process makes available unsaturated and/or functionally substituted $\alpha,\alpha$-dichlorosulfones which were previously not available by conventional processes.

According to the process of the present invention, a trichloromethylsulfone is reacted with a phosphite ester containing at least one alkoxy group linked to the phosphorus. The reaction may be represented by the following equation:

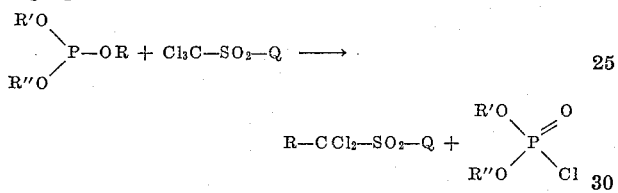

In the equation above, R must be an alkyl group, the term alkyl being used in the wide sense to include aralkyl groups, and unsaturated alkyl groups, while R' and R'' may be alkyl or aryl groups, and they may be the same or different; Q represents any univalent organic residue bonded to the sulfur atom through a carbon atom.

It will be seen from inspection of the above equation that a carbon to carbon bond is formed by replacing one of the chlorines on the trichloromethyl group by the alkyl portion of the alkoxy group in the phosphite ester. There is no known precedent for such a reaction.

In a particularly valuable variation of the present invention, bis-(trichloromethyl)-sulfone is used as the starting material. This compound is capable of reacting at both ends, thereby yielding $\alpha,\alpha,\alpha',\alpha'$-tetrachlorosulfones.

The chlorosulfones produced by the process of the present invention are useful for many purposes. For example, the compound $(CH_2=CHCH_2CCl_2)_2SO_2$ is useful as a fungicide, and the compound

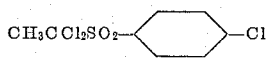

is useful as an insecticide. Unsaturated compounds produced by the present invention may be used as monomers in polymers or copolymers and impart flame resistance due to the presence of the halogen. A certain amount of impact resistance is also imparted to polymers and copolymers by these compounds, apparently by the sulfone grouping. An example for such useful monomer is the compound $CH_2=CHCH_2CCl_2SO_2CH_2Br$. The compound $CH_2=CHCH_2CCl_2SO_2CH_2CH_2COOH$ may be incorporated into polymers with other unsaturated monomers where its polar carboxylic acid group enhances the dyeability of the resulting polymer. In addition, the compounds of the present invention are valuable as intermediates for the syntheses of still other compounds. In this regard, it should be emphasized that the present invention provides a truly novel method for forming a carbon to carbon bond and is therefore a significant contribution to the field of organic synthesis.

The reaction takes place exothermically, and is spontaneous, although it is sometimes advantageous to use slightly elevated temperatures. The reaction is most conveniently carried out in an inert solvent, preferably a hydrocarbon such as benzene.

The only requirements for the reaction are that the phosphite ester contain at least one alkoxy group bonded to the phosphorus, and that the other reactant be a trichloromethylsulfone. The presence or absence of substituents on portions of either molecule removed from the site of reaction is of no consequence. In cases where the phosphite ester contains a free amine substituent, the yield may sometimes be somewhat reduced by a side reaction with the halogen of the trichloromethyl sulfone, but in any case the desired reaction will take place, and a new carbon to carbon bond will be formed to produce an $\alpha,\alpha$-dichlorosulfone. It is a particular advantage of the present invention that the reaction proceeds under gentle conditions and that it can be applied to the synthesis of functionally substituted and/or unsaturated sulfones without interfering with the unsaturation or the functional substituent.

The following examples are given solely for the purpose of illustration and are not to be construed as limitations on the present invention, many variations of which will occur to those skilled in the art without departing from the spirit or scope of the invention.

EXAMPLE 1

*p-Chlorophenyl-(1,1-Dichloro-3-Methyl-3 Butenyl) Sulfone*

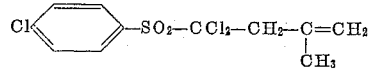

The p-chlorophenyl-trichloromethyl sulfone (19.6 g.) is dissolved in benzene (60 ml.) at 65° C. and the trimethallyl phosphite (20 g.) is added at once. The exothermic reaction, which raises the temperature up to 88° C., seems to be retarded for a few minutes. When the temperature of the reaction mixture starts dropping, it is taken that the reaction has been completed. The solvent is stripped off at reduced pressure and the oily residue is filtered by suction.

The separation of dimethallyl-phosphorochloridate, the by-product of the reaction, is attempted by distillation at reduced pressure, 8.5 ml. (9 g., 60% yield of the theoretical) of this byproduct has been obtained B.P., 96–98° C., $N_D^{25}=1.4571$.

The main product crystallizes when cooled down to give 16 g. of a white solid. Yield 78% of the theory. The M.P. of the product is 100° C. after recrystallization (methanol).

EXAMPLE 2

*n-Octyl-(1,1-Dichloro-3-Methyl-3-Butenyl)-Sulfone*

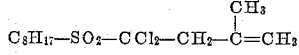

N-octyl-trichloromethyl-sulfone (3.3 g.) and benzene (40 ml.) are placed in an open beaker and trimethallyl-phosphite (3.2 g.) is added at once. The temperature of the mixture rises from .24 to 32° C., then the mixture starts cooling.

The solvent is stripped off and the oily product is recrystallized from abs. alcohol to obtain a white solid, with a M.P. of 29° C. in a yield of 40% of the theory.

EXAMPLE 3

*Cyclohexyl-(1,1-Dichloro-3-Methyl-3-Butenyl)-Sulfone*

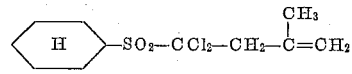

The reagents, cyclohexyl-trichloromethyl sulfone (6.6 g.), trimethallyl phosphite (6.5 g.) and benzene (40 ml.) are brought together in an Erlenmeyer flask at room temperature. The reaction, if any, is very moderate at this temperature. Therefore, in order to complete the reaction, the mixture is warmed up to 80° C. on a hotplate, then allowed to cool down.

The benzene is removed in vacuum and the oil residue is crystallized from abs. alcohol to obtain 3 g. (42% yield of the theory) of a white solid melting at 54° C.

EXAMPLE 4

*Methyl-(1,1-Dichloro-3-Methyl-3-Butenyl)-Sulfone*

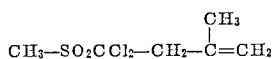

$$CH_3-SO_2CCl_2-CH_2-\underset{\underset{CH_3}{|}}{C}=CH_2$$

Methyl-trichloromethyl-sulfone (12.5 g.) is dissolved in benzene (60 ml.) and trimethallyl phosphite (15 g.) diluted with benzene (60 ml.) is added in 5 equal portions. No substantial rise in the temperature has been noted. After half an hour standing, the mixture is heated to reflux temperature (82° C.) for 15 minutes, then allowed to cool down.

After removing the solvent at reduced pressure, the product is recrystallized from ethanol. 6.4 g. of a white solid, melting at 56° C., is obtained.

EXAMPLE 5

*P-Nitrophenyl-(1,1-Dichloro-3-Methyl-3-Butenyl)-Sulfone*

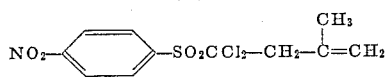

This preparation was carried out in a fashion similar to Example 1, and the product, a slightly yellow solid, is obtained in a yield of 83.5%. The pure product, recrystallized from methanol and hexane, melts at 116° C.

EXAMPLE 6

*4-Chlorophenyl-(1,1-Dichloroethyl)-Sulfone*

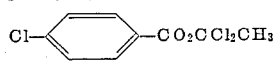

The mixture of p-chlorophenyl-trichloromethyl-sulfone (29.4 g.) and benzene (50 ml.) is warmed up to 65° C. and trimethylphosphite (12.4 g.) is added in small portions. A spontaneous, slightly exothermic reaction takes place. When the addition is completed the reaction mixture is allowed to cool down to room temperature and worked up as in Example 1, to obtain a colorless crystal mass of 28 g. (100% yield). The product is purified by recrystallizations from abs. alcohol to obtain a white solid melting at 110° C.

The other reaction product, dimethylphosphorochloridate, has been identified as its anilide (M.P. 89° C.).

EXAMPLE 7

*Lauryl-(1,1-Dichloroethyl)-Sulfone*

$$C_{12}H_{25}-SO_2CCl_2CH_3$$

Trimethylphosphite (3 g.) is added at once to the mixture of lauryl-trichloromethyl-sulfone (7 g.) and benzene (20 ml.). A slightly exothermic reaction takes place which is completed by heating the mixture to reflux for 20 minutes; then the solvent is removed at reduced pressure.

The residue is taken up in 100 ml. of methanol and the recrystallization is attempted applying Dry-Ice bath temperatures. The product precipitates in white flakes, which melt at 24° C. Yield is 3.5 g., 54% of the theory.

EXAMPLE 8

*Chloromethyl-(1,1-Dichloropropyl)-Sulfone*

$$ClCH_2-SO_2CCl_2CH_2CH_3$$

Triethylphosphite (8.5 g., 0.053 M) is added to the mixture of chloromethyl-trichloromethyl-sulfone (11.6 g., 0.05 M) and hexane (50 ml.). The reaction is spontaneous, bringing the temperature of the mixture up to 62° C. When the temperature starts dropping, it is taken as the completion of the reaction.

The solvent is removed on reduced pressure and 7 ml. of diethylphosphorochloridate is also separated by distillation in vacuo.

The residue is considered to be the crude product. It could not be crystallized even at Dry-Ice temperature. Yield is 9.5 g., 84% of the theory $N_D^{25}=1.4904$.

The pure compound is obtained by distillation. B.P. 1.5 mm. is 96° C., $N_D^{25}=1.4934$.

EXAMPLE 9

*Chloromethyl-(1,1-Dichloro-3-Methyl-3-Butenyl)-Sulfone*

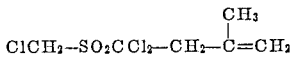

$$ClCH_2-SO_2CCl_2-CH_2-\underset{\underset{CH_3}{|}}{C}=CH_2$$

Chloromethyl-trichloromethyl-sulfone (11.6 g.) hexane (60 ml.) and trimethallylphosphite are brought together in an Erlenmeyer flask. A moderately exothermic reaction takes place raising the temperature of the mixture (18° C.) to 32° C. When the temperature stops rising the mixture is heated up to 60° C. and kept there for 10 minutes.

After removing the solvent 9 ml. of dimethallylphosphorochloridate is obtained by distillation at 2.5 mm. between 106–10° C.

The residue weighs 10.5 g. (yield 84%). It is a slightly yellow oil with a R.I. of 1.4949. The pure product distills at 119° C. at 2 mm. pressure having a refractive index of 1.4988.

EXAMPLE 10

*Chloromethyl-(1,1-Dichloroethyl)-Sulfone*

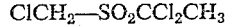

$$ClCH_2-SO_2CCl_2CH_3$$

This compound has been prepared as described in Example 8. The preparation has resulted in a yield of 79% of the theory. $N_D^{25}=1.4998$.

EXAMPLE 11

*Phenyl-(1,1-Dichloro-3-Methyl-3-Butenyl)-Sulfone*

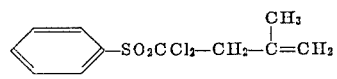

It has been prepared in a yield of 53% by the method described in Example 1. The product melts at 62–3° C.

EXAMPLE 12

*P-Nitrophenyl-(1,1-Dichloroethyl)-Sulfone*

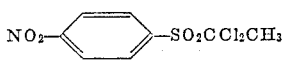

This compound has been prepared as described in Example 5 and obtained in a yield 91%. It is characterized by a M.P. of 156° C.

EXAMPLE 13

*p-Chlorophenyl-(1,1-Dichloro-3-Butenyl)-Sulfone*

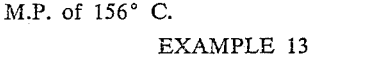

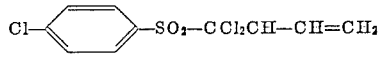

This compound has been prepared by the method given in Example 1. It has been obtained in a yield of 60% in a form of a white solid which melts after several recrystallizations at 66° C.

EXAMPLE 14

*Prep. of α,α,α′,α′-Tetrachlorodiethylsulfone*

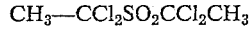

$$CH_3-CCl_2SO_2CCl_2CH_3$$

15 g. of hexachlorodimethyl sulfone is dissolved in 50 ml. of benzene at room temperature. 13 g. of trimethylphosphite is added to this mixture in small portions. The reaction is vigorous and exothermic and the temperature quickly arises up to the boiling point of the solvent (80° C.). To moderate the reaction, the reaction flask is placed in a cold water bath and the mixture is allowed to cool down to 40° C. after each addition. (This is helped by shaking the reaction flask.)

The addition is completed in 20 minutes; then the solvent is stripped off to obtain 17 g. of a pale yellow oily product. A sample of the product is mixed with acetone, then precipitated by adding water. On shaking, the precipitate solidifies to a colorless solid which melts at 49–51° C. The whole batch is worked up this way to obtain 12 g. of product.

It is recrystallized from abs. EtOH at Dry-Ice temperature to obtain the pure product melting at 56–7° C.

Mixed M.P. of the product with an authentic sample of $\alpha,\alpha,\alpha',\alpha'$-tetrachlorodiethyl sulfone does not show depression.

EXAMPLE 15

*$\alpha,\alpha,\alpha',\alpha'$-Tetrachloro-Dipropyl Sulfone*

Hexachloro dimethyl sulfone (15 g.) is dissolved in 50 ml. benzene. A mixture of triethylphosphite (25 g.) and benzene (40 ml.) is added portionwise to the above solution. To moderate the reaction, a cold water bath is applied. The temperature is maintained below 40° C.

The addition is completed in 10 minutes and the solvent is stripped off on reduced pressure. A fraction (9 ml.) following the benzene fraction and boiling at 62° C. at 3 mm. has been separated and identified as diethyl phosphonochloridate.

The residue, a light yellow oil is taken up in abs. alcohol and recrystallized with Dry Ice cooling. M.P. 46° C., yield 11 g.

EXAMPLE 16

By procedures analogous to those of the foregoing examples, other trichloromethyl sulfones may be reacted with other phosphite esters containing an alkoxy group on the phosphorus atom. In all cases, an $\alpha,\alpha$-dichlorosulfone is obtained in a fashion similar to that in the other examples, i.e. by replacement of one of the halogens by an alkyl group.

What is claimed is:

1. A process for the preparation of an $\alpha,\alpha$-dichloroalkylsulfone comprising reacting a trichloromethylsulfone with a phosphite ester containing at least one alkoxy group linked to the phosphorus atom.

2. A process as claimed in claim 1 wherein the reaction takes place in an inert organic solvent.

3. A process for the preparation of an $\alpha,\alpha,\alpha',\alpha'$-tetrachloroalkylsulfone comprising reacting bis-(trichloromethyl)-sulfone with a phosphite ester containing at least one alkoxy group linked to the phosphorous atom.

4. A process as claimed in claim 3 wherein the reaction takes place in an inert organic solvent.

No references cited.